United States Patent
Kwak et al.

(10) Patent No.: US 9,185,729 B2
(45) Date of Patent: *Nov. 10, 2015

(54) WIRELESS COMMUNICATION METHOD AND APPARATUS

(71) Applicant: SAMSUNG ELECTRONICS CO., LTD., Suwon-si (KR)

(72) Inventors: Woon-Geun Kwak, Suwon-si (KR); Kyun-Hoe Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,303

(22) Filed: Nov. 7, 2013

(65) Prior Publication Data

US 2014/0064222 A1  Mar. 6, 2014

Related U.S. Application Data

(63) Continuation of application No. 12/108,210, filed on Apr. 23, 2008, now Pat. No. 8,594,119.

(30) Foreign Application Priority Data

Aug. 20, 2007   (KR) ........................ 10-2007-0083389

(51) Int. Cl.
*H04W 74/08* (2009.01)
*H04W 74/00* (2009.01)
*H04W 74/04* (2009.01)

(52) U.S. Cl.
CPC .......... *H04W 74/085* (2013.01); *H04W 74/002* (2013.01); *H04W 74/04* (2013.01)

(58) Field of Classification Search
CPC ............ H04W 72/0446; H04W 74/08; H04W 74/085
USPC ......... 370/310, 336, 431, 442, 445; 455/3.01, 455/403, 73

See application file for complete search history.

(56) References Cited

U.S. PATENT DOCUMENTS 4,998,247 A * 3/1991 Irvine-Halliday et al. .... 370/407
5,677,909 A 10/1997 Heide
(Continued)

FOREIGN PATENT DOCUMENTS

KR   1020020016733 A   3/2002
KR   1020030043954 A   6/2003
(Continued)

OTHER PUBLICATIONS

IEEE Standard Part 15.4: Wireless Medium Access Control (MAC) and Physical Layer (PHY) Specificaitons for Low-Rate Wireless Personal Area Networks (WPANs), Sep. 2006.*
(Continued)

*Primary Examiner* — Siming Liu
(74) *Attorney, Agent, or Firm* — Sughrue Mion, PLLC

(57) ABSTRACT

A method and apparatus are provided for enabling a user to effectively use a wireless network using a contention free channel access service. The wireless communication method includes receiving a contention free channel access request frame from at least one device in a wireless network in a superframe, and broadcasting a traffic information message including contention free channel access information in the superframe after the contention free channel access request frame is received.

12 Claims, 7 Drawing Sheets

(56) References Cited

U.S. PATENT DOCUMENTS

| | | | |
|---|---|---|---|
| 6,717,926 | B1 | 4/2004 | Deboille et al. |
| 7,310,352 | B2 | 12/2007 | Beser |
| 8,594,119 | B2 * | 11/2013 | Kwak et al. ............ 370/442 |
| 2002/0105970 | A1 | 8/2002 | Shvodian |
| 2004/0053621 | A1 | 3/2004 | Sugaya |
| 2005/0135275 | A1 * | 6/2005 | Hester et al. ............ 370/256 |
| 2005/0255844 | A1 | 11/2005 | Sugaya et al. |
| 2009/0067389 | A1 * | 3/2009 | Lee et al. ............ 370/336 |

FOREIGN PATENT DOCUMENTS

| | | |
|---|---|---|
| KR | 1020050029112 A | 3/2005 |
| KR | 1020060052383 A | 5/2006 |

OTHER PUBLICATIONS

Communication, dated Sep. 16, 2013, issued by the Korean Intellectual Property Office, in counterpart Application No. 1020070083389.

IEEE Standard for Information Technology, Part 15.4b: Wireless Medium Access Control (MAC) and Physical Layer (PHY) Specifications for Low Rate Wireless Personal Area Networks (WPANS), Mar. 2006, 301 pages total.

IEEE Standard for Information Technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANs), Sep. 2006, IEEE Computer Society.

First Office Action issued in parent U.S. Appl. No. 12/108,210 from the U.S. Patent and Trademark Office on Mar. 3, 2011.

Final Office Action issued in parent U.S. Appl. No. 12/108,210 from the U.S. Patent and Trademark Office on Aug. 17, 2011.

Office Action issued in parent U.S. Appl. No. 12/108,210 from the U.S. Patent and Trademark Office on Dec. 22, 2011.

Office Action issued in parent U.S. Appl. No. 12/108,210 from the U.S. Patent and Trademark Office on Oct. 4, 2012.

Office Action issued in parent U.S. Appl. No. 12/108,210 from the U.S. Patent and Trademark Office on Apr. 11, 2013.

Notice of Allowance issued in parent U.S. Appl. No. 12/108,210 from the U.S. Patent and Trademark Office on Jul. 25, 2013.

* cited by examiner

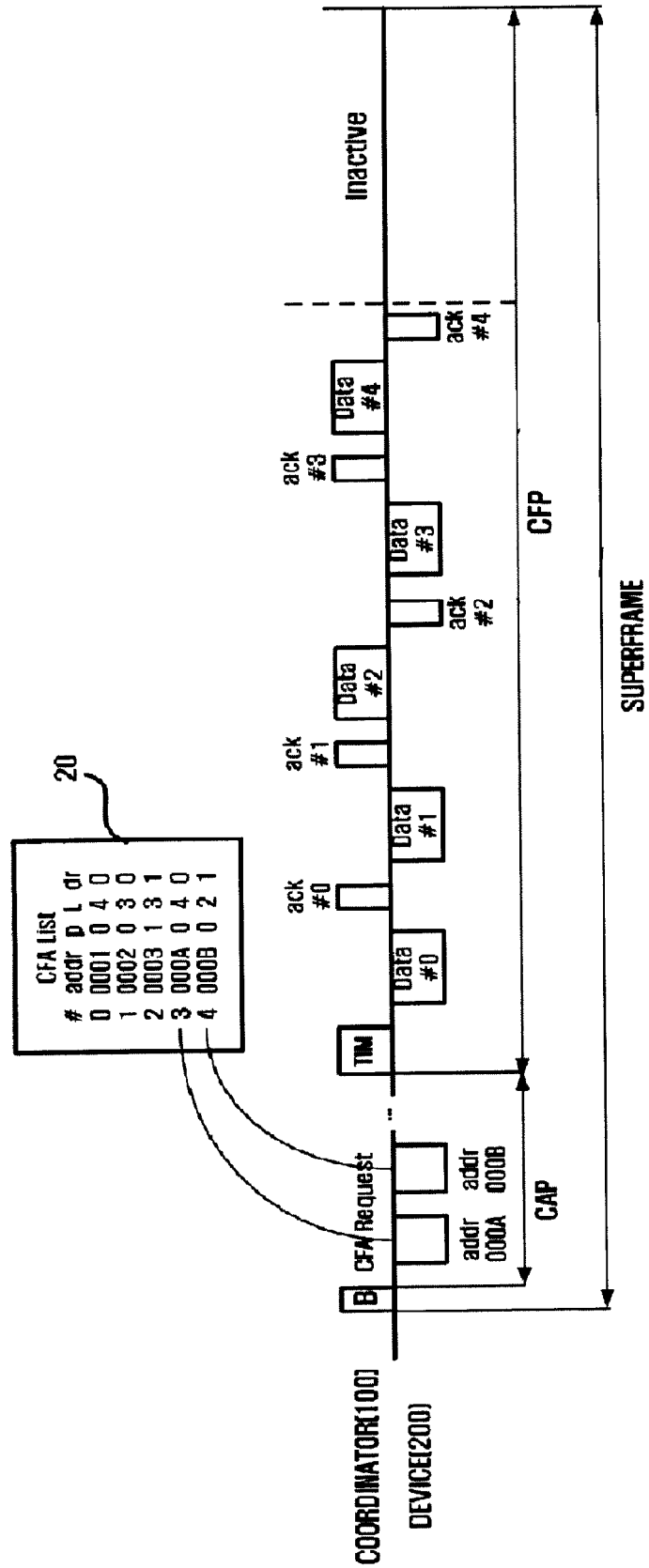

WIRELESS COMMUNICATION METHOD AND APPARATUS

CROSS REFERENCE TO RELATED APPLICATION

This application is a continuation of U.S. application Ser. No. 12/108,210 filed Apr. 23, 2008, which claims priority from Korean Patent Application No. 10-2007-0083389 filed on Aug. 20, 2007 in the Korean Intellectual Property Office, the disclosures of which are incorporated herein by reference in their entirety.

BACKGROUND OF THE INVENTION

1. Field of the Invention

Methods and apparatuses consistent with the present invention relates to wireless networking, and more particularly, enabling a user to effectively use a wireless network using a contention free channel access service.

2. Description of the Related Art

The IEEE 802.15.4 standard is a low rate wireless personal area network (WPAN) technique, and is considered as a standard for media access control (MAC) and physical (PHY) layers of a wireless center network or a Zigbee network. Implementations of the IEEE 802.15.4 standard should have a low application processing speed, a low cost, and low power consumption, and satisfy timeless characteristics in applications, such as security, control, and monitoring. Therefore, the IEEE 802.15.4 MAC layer adopts a superframe structure and thus introduces a guaranteed time slot (GTS) concept suitable for low power consumption, and real-time or timeless applications.

The size of a superframe depends on an superframe order (SO). The increasing rate of the SO to the time slot is 2. One time slot is divided into backoff boundaries each having a 20 symbol size. For example, when the SO is 0, one time slot is divided into three backoff boundaries. When the SO is 1, one time slot is divided into six backoff boundaries.

FIG. 1 is a diagram illustrating the structure of a general superframe.

As shown in FIG. 1, one superframe is divided into sixteen time slots, devices are allocated with GTSs in the units of time slots. The device exclusively uses the allocated time slot. However, when the allocated time slot is not used for a period that is determined by a standard, the allocation of the time slot is canceled. In addition, since the number of time slots in the superframe is limited to 16, a maximum of seven devices can be allocated with the GTSs. In this case, the GTS is allocated through a beacon. Therefore, when the GTS increases, a beacon frame also increases.

It takes a large amount of time to allocate the GTSs to the devices and to provide services to the devices. When the bandwidth of one time slot is larger than 250 kbps, one device uses a maximum bandwidth of 250 kbps, which causes the unnecessary use of the bandwidth.

Korean Unexamined Patent Publication No. 2002-016733 discloses an access terminal including: a unit that determines a bandwidth in a band to be allocated to a wireless communication terminal and allocates a uniform band at a predetermined bandwidth to the wireless communication terminal; and a unit that receives a transfer rate from a wireless communication terminal that wants to transmit or receive in a contention free period in which the terminal can transmit or receive data in real time, among the wireless communication terminals that are allocated with the uniform band, and adjusts the ratio of the contention free period to the allocated bandwidth according to the received transfer rate. However, Korean Unexamined Patent Publication No. 2002-016733 does not disclose a technique for a contention free channel access service.

SUMMARY OF THE INVENTION

The present invention provides a method and apparatus for enabling a user to effectively use a wireless network using a contention free channel access service.

According to an aspect of the present invention, there is provided a wireless communication method including receiving a contention free channel access request frame from at least one device in a wireless network, and broadcasting a traffic information message including contention free channel access information in a superframe including the time when the contention free channel access request frame is received.

According to another aspect of the present invention, there is provided a wireless communication method including transmitting a contention free channel access request frame to a coordinator in a wireless network, receiving a traffic information message including contention free channel access information from the coordinator in a superframe including the time when the contention free channel access request frame is transmitted, and occupying a wireless medium on the basis of the contention free channel access information.

According to another aspect of the present invention, there is provided a wireless communication apparatus including a frame processing unit analyzing a contention free channel access request frame transmitted from at least one device in a wireless network, a frame generating unit generating a traffic information message including contention free channel access information on the basis of the analyzed contention free channel access request frame, and a transmitting/receiving unit receiving the contention free channel access request frame from the device, and broadcasting the generated traffic information message in a superframe including the time when the contention free channel access request frame is received.

According to another aspect of the present invention, there is provided a wireless communication apparatus including a frame generating unit generating a contention free channel access request frame, a frame processing unit analyzing a traffic information message transmitted from a coordinator in a superframe including the time when the contention free channel access request frame is transmitted, a transmitting/receiving unit transmitting the generated contention free channel access request frame, and receiving the traffic information message including contention free channel access information, and a CPU occupying a wireless medium on the basis of the contention free channel access information.

BRIEF DESCRIPTION OF THE DRAWINGS

The above and other aspects of the present invention will become more apparent by describing in detail exemplary embodiments thereof with reference to the attached drawings in which:

FIGS. 2A to 2C are diagrams illustrating communication timing according to an exemplary embodiment of the invention;

DETAILED DESCRIPTION OF THE INVENTION

Hereinafter, exemplary embodiments of the invention will be described in detail with reference to the accompanying drawings.

Figure 1:
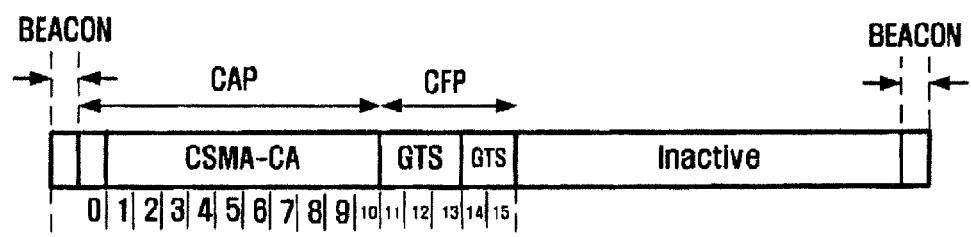
FIG. 1 is a diagram illustrating the structure of a general superframe.
Figure 2A:
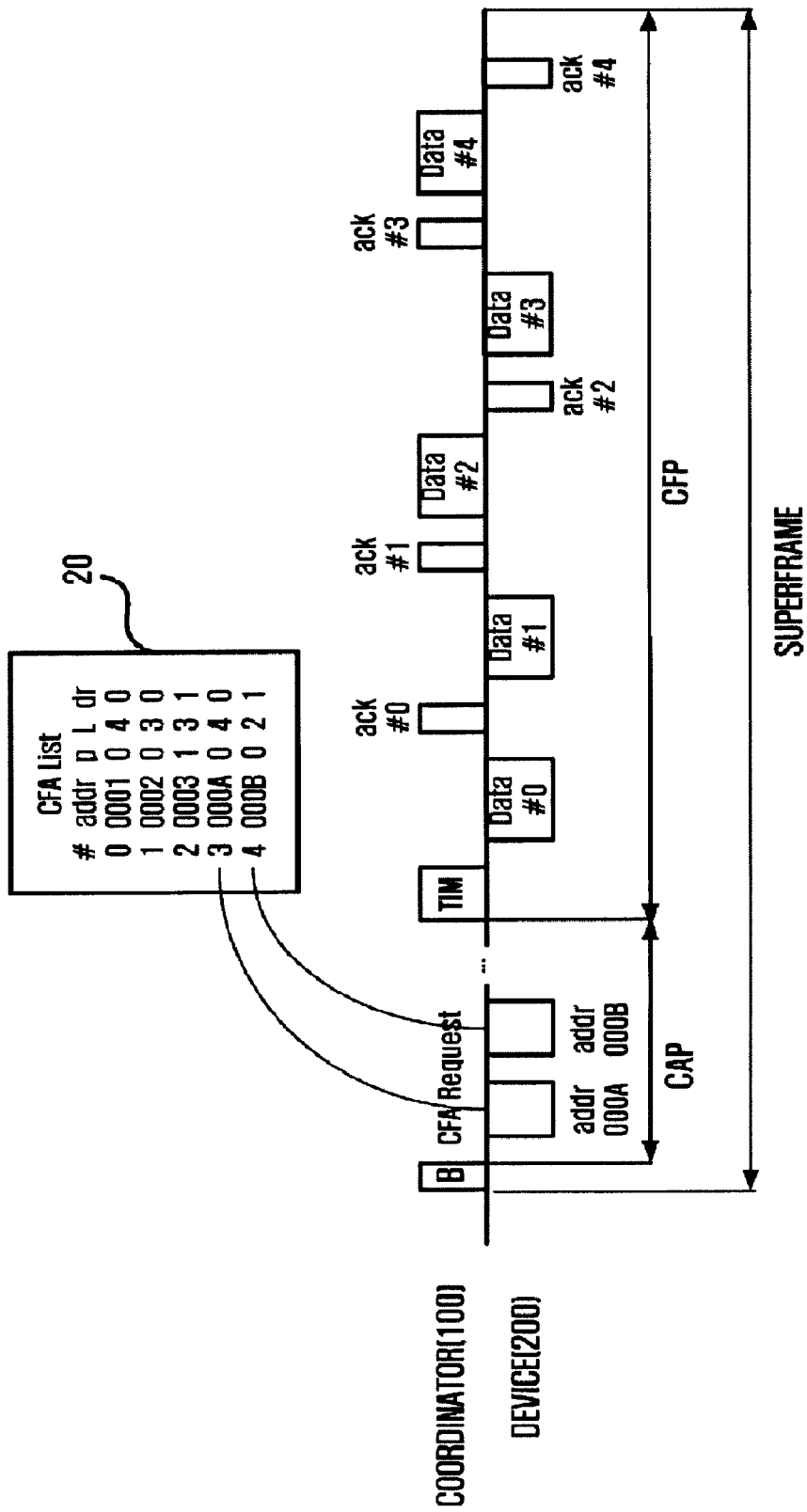
Figure 2B:
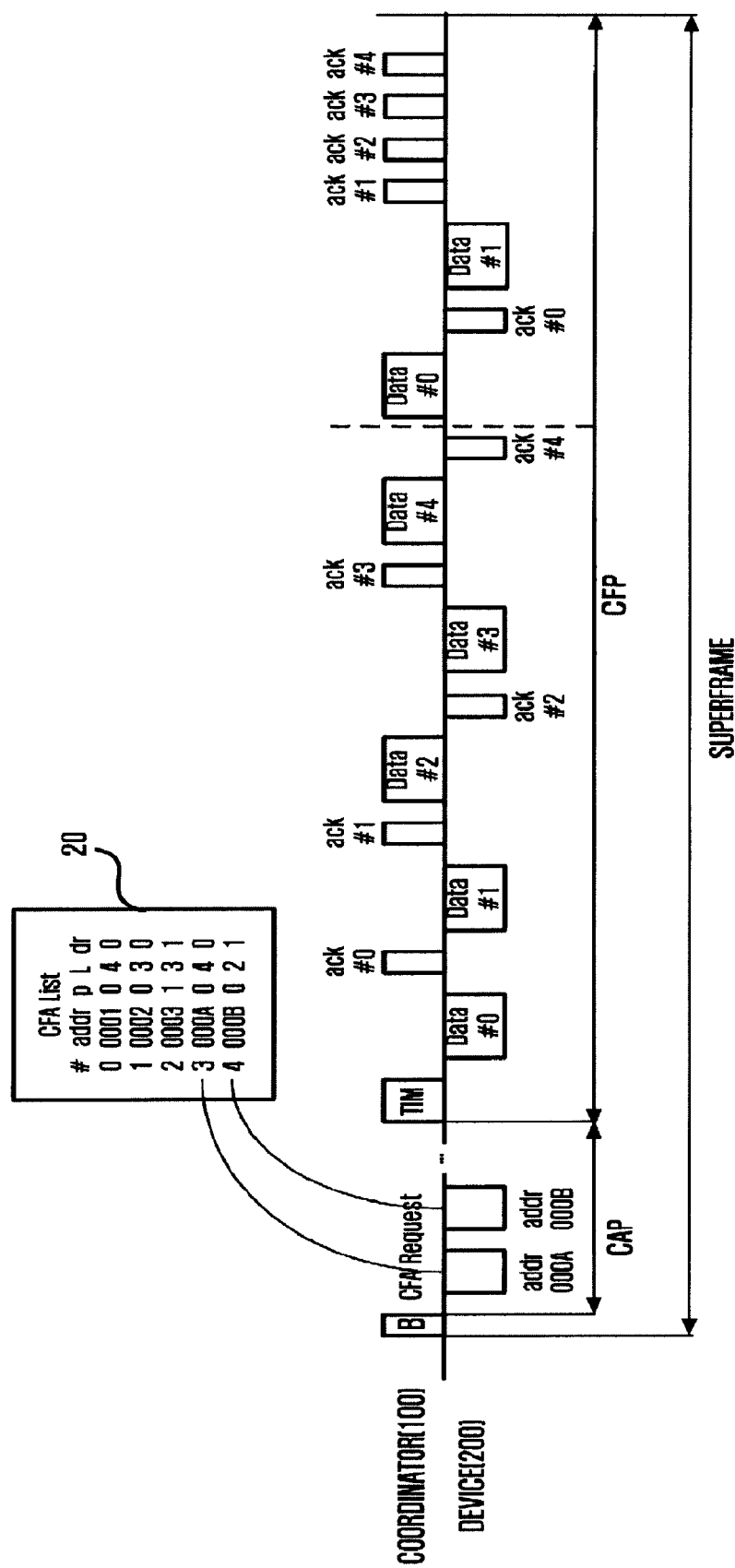

FIG. 2A to 2C are diagrams illustrating communication timing according to an exemplary embodiment of the invention. In this exemplary embodiment, it is assumed that one coordinator 100 and a plurality of devices 200 are provided. The coordinator 100 and the devices 200 may be wireless communication devices that follow an IEEE 802.15.4 standard.

As shown in FIG. 2A, the devices 200 request the coordinator 100 to provide a contention free access (CFA) service during a contention access period (CAP) of a superframe. The superframe includes a contention period in which the devices 200 contentiously occupy a wireless medium and a contention free period in which the devices 200 occupy the wireless medium in a contention free manner. The devices 200 request the CFA service through a CFA request frame. In this case, the devices 200 request a bandwidth on the basis of a backoff period which is narrower than a time slot, which makes it possible to prevent unnecessary use of a bandwidth. The backoff period means a time unit including a predetermined number of symbols. In addition, the coordinator 100 adds the bandwidths requested by the devices 200 and sets n periods for providing the CFA service among 16 channels of the superframe. When the bandwidth of the time slot is sufficiently wide, a lot of devices 200 can provide services through only one time slot.

After the devices 200 request the CFA service, the coordinator 100 broadcasts a traffic information message (TIM) including a CFA list 20 to all of the devices 200 when a contention free period (CFP) starts. The TIM is broadcast in the superframe that includes the time when the CFA request frame is received. The devices 200 can immediately check whether their addresses exist on the CFA list 20 included in the TIM. When their addresses exist in the CFA list 20, the devices are given authority to receive the CFA service. In the CFA list 20, a symbol # indicates a sequence number, p indicates pending data, L indicates a maximum length, and dr indicates a direction. Next, the CFA request frame transmitted from the devices 200 to the coordinator 100 and a TIM frame transmitted from the coordinator 100 to the devices 200 will be described in detail below with reference to FIGS. 3A and 3B.

When the TIM is completely broadcast, the coordinator 100 and the devices 200 transmit and receive data in the order of the CFA list.

For example, since device No. 0 has dr=0, the device No. 0 transmits data #0, and the coordinator 100 broadcasts acknowledgement packet No. 0 (ack #0). Then, the devices 200 receive the acknowledgement packet broadcast by the coordinator 100, and the next device prepares to transmit (or receive) data. Subsequently, since device No. 1 has dr=0, the device No. 1 transmits data #1, and the coordinator 100 broadcasts acknowledgement packet No. 1 (ack #1). Then, since device No. 2 has dr=1, the coordinator 100 transmits data #2, and the device No. 2 broadcasts acknowledgement packet No. 2 (ack #2). When the next device (for example, device No. 3) does not receive the acknowledgement packet transmitted by the device No. 2, device No. 3 cannot start transmission of data. Therefore, the coordinator 100 transmits a frame P#1 to forcibly perform polling when there is no data transmission during a long inter-frame space (LIFS). In this way, device No. 3 can start data transmission. Similarly, the other devices sequentially transmit. The devices requesting to provide services in the CAP period may not receive services in the current superframe. In this case, the devices that do not receive the services are given No. 0 in the next superframe.

As shown in FIG. 2B, when there is an extra space in the CFP period even though all of the devices 200 receive the CFA service according to the sequence number, the devices can start data transmission, starting from the device No. 0 (Cyclic-CFA).

For example, the device No. 0 transmits data #0, and the coordinator 100 broadcasts acknowledgement packet No. 0 (ack #0). Then, the devices receive the acknowledgement packet broadcast by the coordinator 100, and the next device prepares to transmit (or receive) data.

Then, device No. 1 should transmit data. However, in this case, when there is no data to be transmitted, the device No. 1 broadcasts an acknowledgement packet (for example, ack #1) including its number to enable the next device to transmit data. Then, the devices sequentially transmit data or acknowledgement packets, in the same manner as described above.

As shown in FIG. 2C, when there is an extra space in the CFP period even though all of the devices 200 receive the CFA service according to the sequence number, the operation mode may be switched to an inactive mode (Normal-CFA).

The invention is designed such that GTS is also operated in order for compatibility with the standard and the coordinator 100 sets the CFP period on the basis of CFA information and GTS information.

Figure 3A:
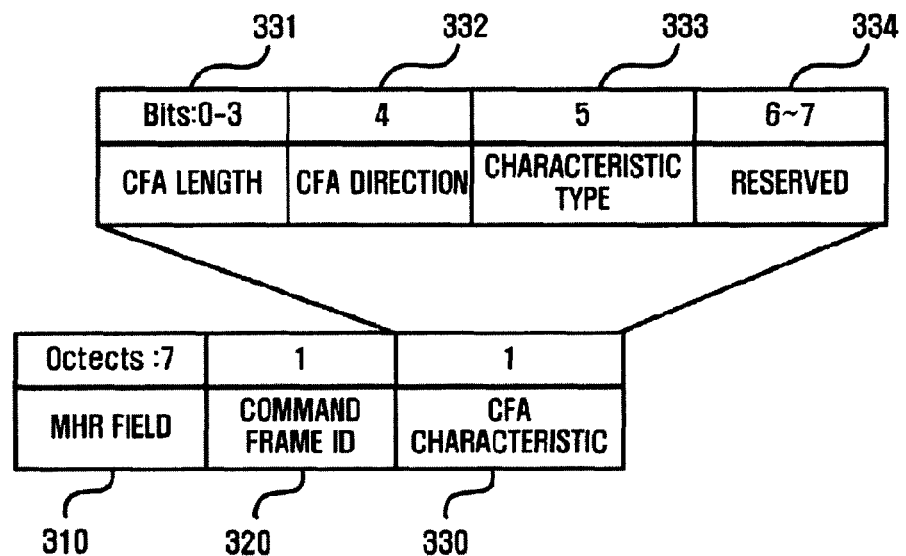
FIGS. 3A and 3B are diagrams illustrating the structure of a CFA request frame and a TIM frame according to an exemplary embodiment of the invention.
Figure 3B:
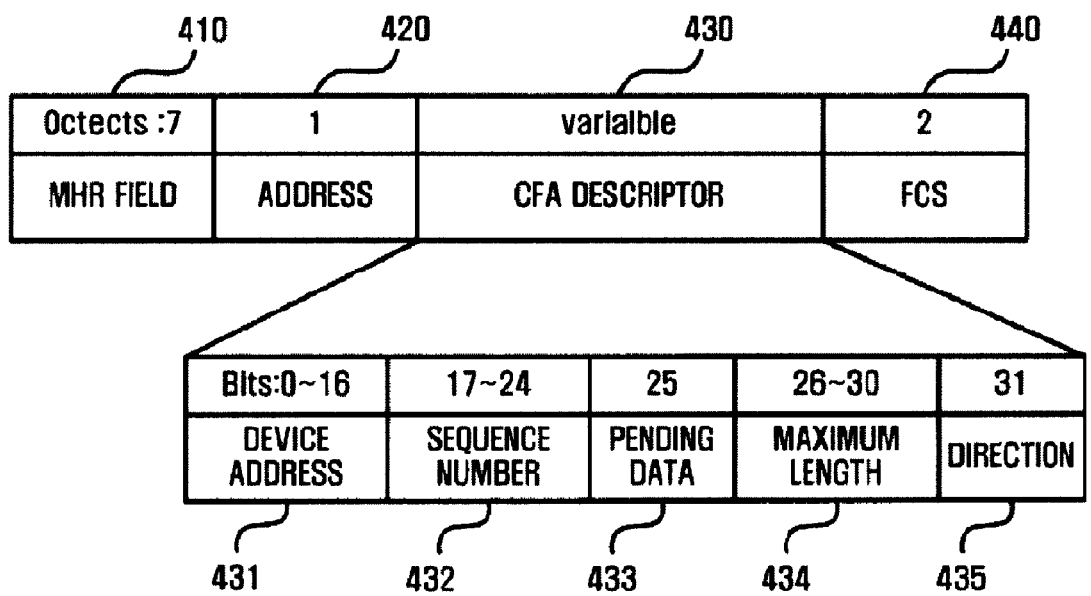

FIGS. 3A and 3B are diagrams illustrating the structures of a CFA request frame and a TIM frame according to an exemplary embodiment of the invention.

As shown in FIG. 3A, the CFA request frame transmitted from the device 200 to the coordinator 100 includes an MAC header (MHR) field 310, a command frame identifier (ID) field 320, which is an MAC payload, a CFA characteristic field 330, and an FCS (frame check sequence) field. The command frame ID field 320 indicates a unique ID of the CFA request frame, and one of the ID numbers that are reserved in the standard is given as an ID.

The CFA characteristic field 330 includes a CFA length field 331, a CFA direction field 332, a characteristic type field 333, and a reserved field 334.

The CFA length field 331 means the unit of a backoff period, which is the maximum bandwidth (=2^CFALength backoff periods) used by the device 200. That is, the CFA length field 331 is identical with a maximum length field of the TIM frame.

The CFA direction field 332 is used to set whether to operate the device 200 in a reception mode (=1) or a transmission mode (=0), and is identical to a direction field of the TIM frame.

The characteristic type field 333 having a value of 1 indicates that the device requests the CFA service, and the characteristic type field 333 having a value of 0 indicates that the request of the CFA service is canceled.

As shown in FIG. 3B, the TIM frame transmitted from the coordinator 100 to the device 200 includes an MAC header (MHR) field 410, an address field 420, which is a Mac payload, a CFA descriptor field 430, and a frame check sequence (FCS) field 440.

The CFA descriptor field 430 includes a device address field 431, a sequence number (#) field 432, a pending data (p) field 433, a maximum length (L) field 434, and a direction (dr) field 435.

The device address field 431 indicates a 16-bit address of the device 200, and the sequence number field (#) 432 is used to determine the order in which the devices 200 occupy a wireless medium or the order in which the devices 200 transmit data. The sequence number (#) field 432 is set such that data is sequentially transmitted at the time when an acknowledge packet number (ack No.) that is smaller than a data number by 1 is received. In the sequence number field 432, the sequence number may be given in the order in which the CFA is requested.

When dr=1, 1 is written in the pending data field (p) 433, which indicates that there is pending data in the coordinator 100. The maximum length field (L) 434 indicates a order of maximum data length that can be processed by the device 200, and the maximum data length may be $2^L$ backoff periods. The direction (dr) field 435 indicates that the device 200 operates in the reception mode (bit "1") or in the transmission mode (bit "0").

Figure 4:
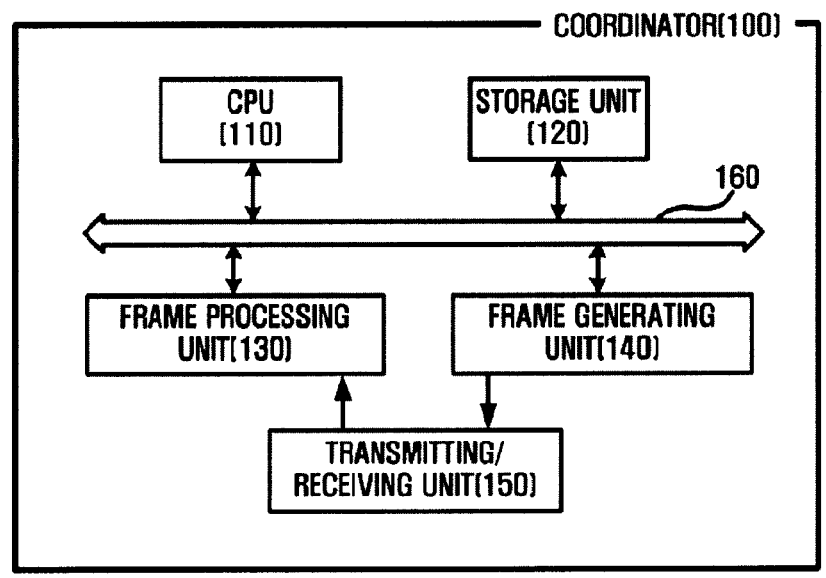
FIG. 4 is a block diagram illustrating the structure of a coordinator according to an exemplary embodiment of the invention.

FIG. 4 is a block diagram illustrating the structure of the coordinator according to the exemplary embodiment of the invention.

As shown in FIG. 4, the coordinator 100 includes a CPU 110, a storage unit 120, a frame processing unit 130, a frame generating unit 140, and a transmitting/receiving unit 150.

The CPU 110 controls other components connected to a bus 160, and performs processing on the upper layers (for example, a logical link control (LLC) layer, a network layer, a transmission layer, and an application layer) of an MAC layer among general communication layers. Therefore, the CPU 110 processes data received from the frame processing unit 130 or generates transmission data.

The storage unit 120 stores the received data processed by the CPU 110 or the transmission data generated by the CPU 110. The storage unit 120 may be a non-volatile memory device, such as a ROM, a PROM, an EPROM, an EEPROM, or a flash memory, a volatile memory device, such as a RAM, a storage medium, such as a hard disk or an optical disk, or other memories that are known in this technical field.

The frame processing unit 130 analyzes the frame that is transmitted from at least one device 200 in a wireless network. For example, the frame processing unit 130 may analyze the CFA request frame that has been described with reference to FIG. 3A.

For example, the frame processing unit 130 analyzes the transmitted CFA request frame to check the maximum bandwidth that can be used by the device 200, check whether the device wants to transmit or receive data, and check whether the device 200 requests the CFA service or cancels the request.

The frame generating unit 140 generates a frame including CFA information to be transmitted to the device 200, on the basis of the CFA request frame analyzed by the frame processing unit 130. For example, the frame generating unit 140 may generate the TIM frame that has been described with reference to FIG. 3B.

The transmitting/receiving unit 150 broadcasts the TIM frame transmitted from the frame generating unit 140 to the device 200. In addition, the transmitting/receiving unit 150 receives the CFA request frame transmitted from the device 200 and transmits the received frame to the frame processing unit 130. The CFA request frame is transmitted in the contention period of the superframe, and the TIM frame is broadcast after the contention period ends.

The transmitting/receiving unit 150 receives the acknowledgement packet transmitted from the device 200, and transmits a response message included in the acknowledgement packet to the frame processing unit 130.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Figure 5:
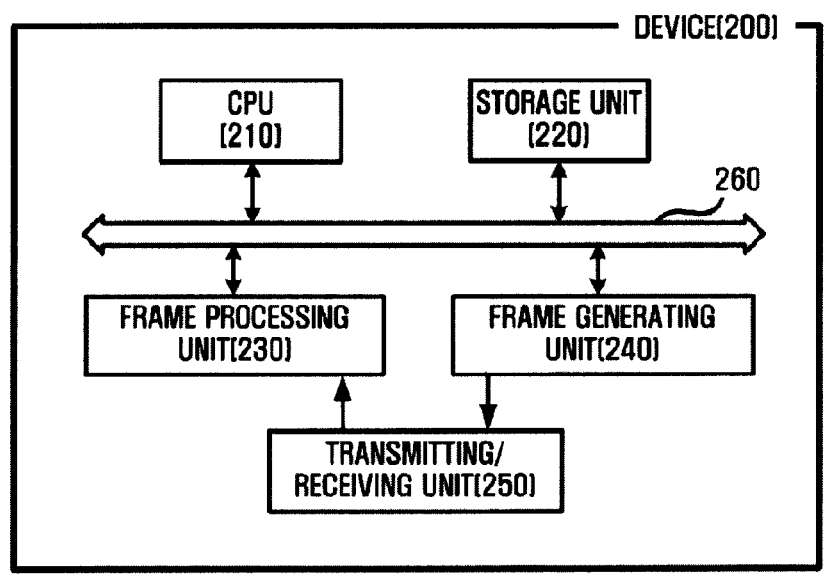
FIG. 5 is a block diagram illustrating the structure of a device according to an exemplary embodiment of the invention.

FIG. 5 is a block diagram illustrating the structure of the device according to the exemplary embodiment of the invention.

As shown in FIG. 5, the device 200 includes a central processing unit (CPU) 210, a storage unit 220, a frame processing unit 230, a frame generating unit 240, and a transmitting/receiving unit 250.

The CPU 210 and the storage unit 220 have the same functions as the CPU 110 and the storage unit 120 of the coordinator 100 shown in FIG. 4.

The frame processing unit 230 analyzes the frame received from the coordinator 100. For example, the frame processing unit 230 may analyze the TIM frame that has been described with reference to FIG. 3B.

The frame generating unit 240 generates a frame to be transmitted to the coordinator 100. For example, the frame generating unit 240 may generate the CFA request frame that has been described with reference to FIG. 3A.

The transmitting/receiving unit 250 transmits the frame received from the frame generating unit 240 to the coordinator 100. In addition, the transmitting/receiving unit 250 receives the frame from the coordinator 100 and transmits the received frame to the frame processing unit 230.

The transmitting/receiving unit 250 receives an acknowledgement packet from the coordinator 100, and transmits a response message included in the acknowledgement packet to the frame processing unit 230.

Figure 6:
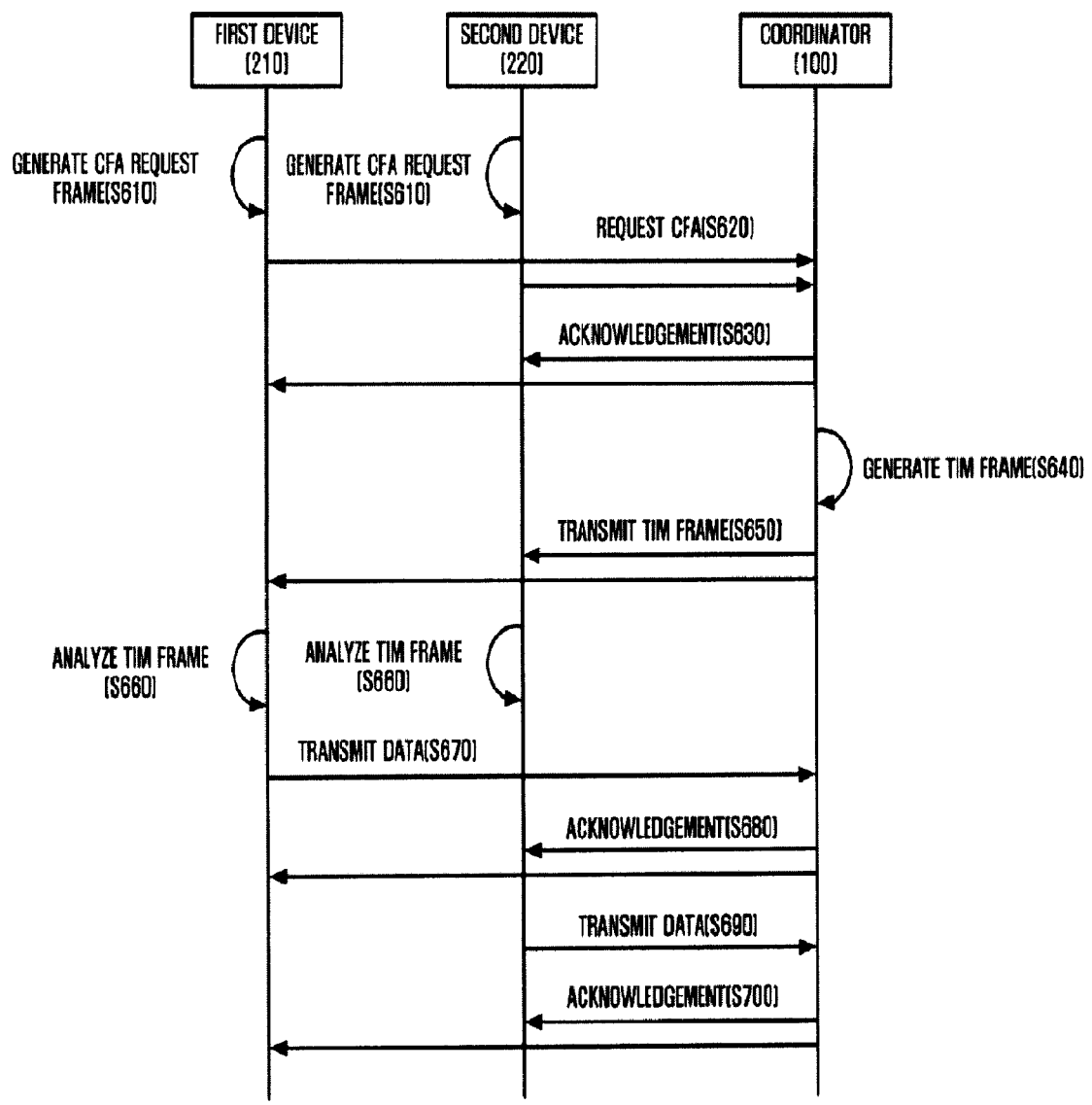
FIG. 6 is a flowchart illustrating a wireless communication method according to an exemplary embodiment of the invention.

FIG. 6 is a flowchart illustrating a wireless communication method according to an exemplary embodiment of the invention. In this exemplary embodiment, it is assumed that one coordinator 100 and first and second devices 210 and 220 are provided.

Initially, the first and second devices 210 and 220 generate CFA request frames (S610), and contentiously occupy a wireless medium during the CAP of a superframe. Then, the first and second devices 210 and 220 transmit the CFA request frames to the coordinator 100 to request a CFA service (S620). Since the CFA request frame has been described with reference to FIG. 3A, a detailed description thereof will be omitted in this exemplary embodiment. The first and second devices 210 and 220 may request a necessary bandwidth in the unit of a backoff period, which is shorter than a time slot, which makes it possible to prevent the unnecessary use of the bandwidth.

Then, the coordinator 100 transmits an acknowledgement packet indicating that the CFA request frame is received (S630). Then, the coordinator 100 analyzes the received CFA request frame and generates a TIM frame (S640). Since the TIM frame has been described with reference to FIG. 3B, a detailed description thereof will be omitted in this exemplary embodiment.

Subsequently, the coordinator 100 broadcasts the generated TIM frame to the first and second devices 210 and 220 at the beginning of the CFP period (S650). Then, the first and second devices 210 and 220 receive the broadcast TIM frame and analyze a CFA list included in the TIM frame (S660).

Successively, the first and second devices 210 and 220 transmit and receive data according to the sequence number of the CFA list on the basis of the analyzed results of the CFA list.

For example, when the first device 210 is given number 0, the second device 220 is given number 1, the direction (dr) values of the first and second devices are '0', first, the first device 210 transmits data to the coordinator 100 (S670). Then, the coordinator 100 receives the data transmitted from the first device 210, and broadcasts an acknowledgment packet indicating the reception of the data to the first and second devices 210 and 220 (S680).

Then, when receiving the acknowledgement packet broadcast from the coordinator 100, the second device 220 that is given number 1 transmits data to the coordinator 100 (S690). Then, the coordinator 100 receives data transmitted from the second device 220, and broadcasts an acknowledgement packet indicating the reception of the data to the first and second devices 210 and 220 (S700).

As described above, the wireless communication method and apparatus according to the exemplary embodiments of the invention may have the following effects.

A large number of devices can receive contention free services at the same time.

Further, when devices request services during a CAP period, the devices can immediately know that the service request is accepted during the CFP period, which makes it possible to shorten the time required to start the contention free service.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A wireless communication method comprising:
receiving, by a coordinator, a contention free channel access request frame during a contention access period of a superframe from at least one device among a plurality of devices in a wireless network; and
broadcasting a traffic information message including a contention free access list which was authorized to receive a contention free access service, to the at least one device among the plurality of devices after the contention free channel access request frame is received and when a contention free period of the superframe starts,
wherein the at least one device requests a necessary bandwidth of the contention free channel access in a unit of a backoff period which is a time unit including a predetermined number of symbols and is shorter than a time slot unit.

2. The wireless communication method of claim 1, wherein the contention free channel access request frame comprises a contention free channel access length field, a contention free channel access direction field, a characteristic type field, and a reserved field, and
the traffic information message comprises a device address field, a sequence number field, a pending data field, a maximum length field, and a direction field.

3. The wireless communication method of claim 2, wherein:
the plurality of devices occupy a wireless medium in a contention free manner based on the contention free channel access information in the contention free period of the superframe, and
the plurality of devices, which are assigned contention free channels according to a sequence number included in the sequence number field, circularly occupy the wireless medium until the contention free period of the superframe ends.

4. The wireless communication method of claim 2, wherein:
the plurality of devices occupy a wireless medium in a contention free manner based on the contention free channel access information in the contention free period of the superframe, and
the plurality of devices in the wireless network operate in an inactive mode within a bandwidth other than the bandwidths occupied by the devices, which are assigned contention free channels according to a sequence number included in the sequence number field, in the contention free period of the superframe.

5. The wireless communication method of claim 1, wherein the at least one device requests a bandwidth of the contention free channel access based on a backoff period which is narrower than a time slot.

6. A wireless communication method comprising:
transmitting, by a device, a contention free channel access request frame to a coordinator in a wireless network in a superframe during a contention access period of the superframe;
receiving a traffic information message including a contention free access list which was authorized to receive a contention free access service, comprising contention free channel access information from the coordinator in the superframe after the contention free channel access request frame is transmitted and when a contention free period of the superframe starts; and
occupying a wireless medium based on the contention free channel access information,
wherein the device requests a necessary bandwidth of the contention free channel access in a unit of a backoff period which is a time unit including a predetermined number of symbols and is shorter than a time slot unit.

7. The wireless communication method of claim 6, wherein the contention free channel access request frame comprises a contention free channel access length field, a contention free channel access direction field, a characteristic type field, and a reserved field, and
the traffic information message comprises a device address field, a sequence number field, a pending data field, a maximum length field, and a direction field.

8. The wireless communication method of claim 7, wherein the occupying the wireless medium comprises transmitting data if an acknowledgement packet having a sequence number that is smaller than a sequence number included in the sequence number field by 1 is received.

9. The wireless communication method of claim 7, wherein:
- the device in the wireless network occupies a wireless medium in a contention free manner based on the contention free channel access information in the contention free period of the superframe, and
- the device, which is assigned contention free channel access according to a sequence number included in the sequence number field, circularly occupies the wireless medium until the contention free period of the superframe ends.

10. The wireless communication method of claim 9, wherein, if the device occupies the wireless medium at least two times according to the sequence number during the contention free period and there is no data to be transmitted, an acknowledgement packet comprising the sequence number is broadcast.

11. The wireless communication method of claim 7, wherein:
- the device in the wireless network occupies the wireless medium in a contention-free manner based on the contention free channel access information in the contention free period of the superframe, and
- the device, which is assigned the contention free channel access according to a sequence number included in the sequence number field, operates in an inactive mode within a bandwidth other than the occupied bandwidths in the contention free period of the superframe.

12. The wireless communication method of claim 6, wherein the device requests a bandwidth of the contention free channel access based on a backoff period which is narrower than a time slot.

* * * * *